March 5, 1935.  C. G. MILLER ET AL  1,993,614
CUTTING MACHINE
Filed April 10, 1934  2 Sheets-Sheet 1

Charles G. Miller
William R. Fintleman, INVENTORS
BY Victor J. Evans & Co.
ATTORNEY March 5, 1935.  C. G. MILLER ET AL  1,993,614
CUTTING MACHINE
Filed April 10, 1934  2 Sheets-Sheet 2
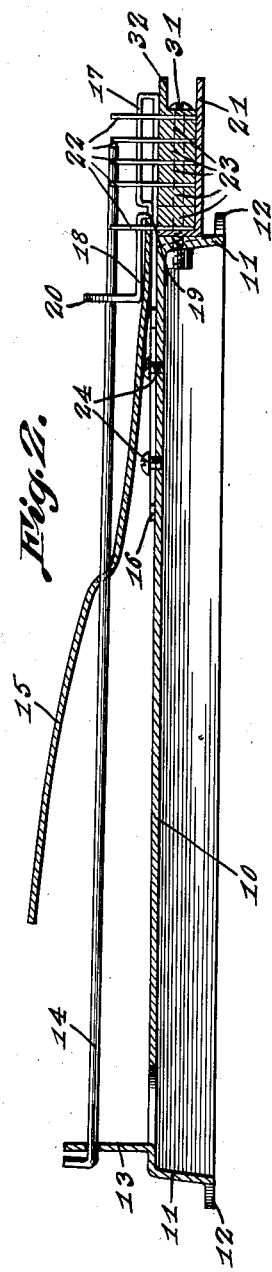
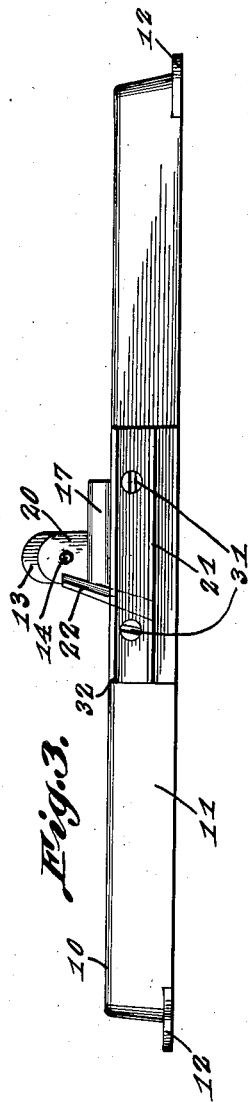
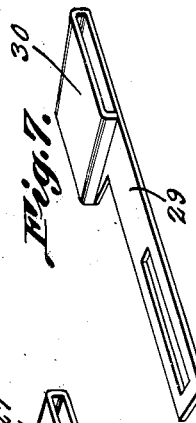
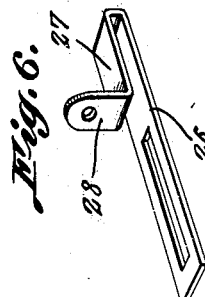
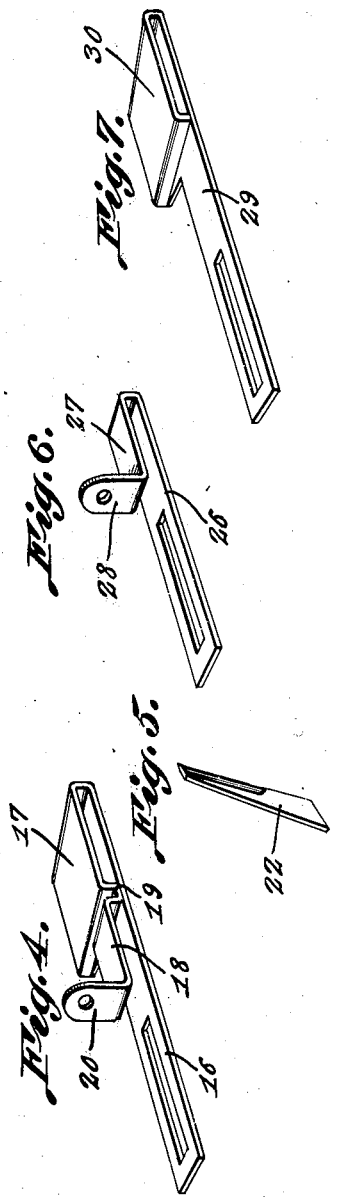
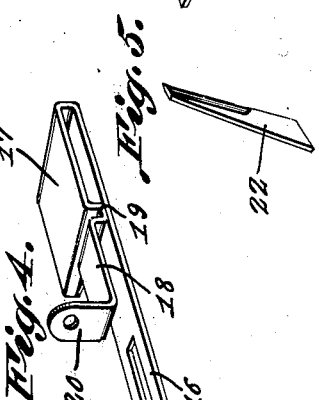
Charles G. Miller
William R. Fintleman, INVENTORS
BY Victor J. Evans & Co.
ATTORNEY Patented Mar. 5, 1935

1,993,614

UNITED STATES PATENT OFFICE 1,993,614

CUTTING MACHINE

Charles G. Miller and William R. Fintleman, Fort Madison, Iowa

Application April 10, 1934, Serial No. 719,940

3 Claims. (Cl. 164—37)

The invention relates to a cutting machine and more especially to a combined belt stripper and lacing cutter.

The primary object of the invention is the provision of a machine of this character, wherein pieces of leather, either in circular form or in strips, may be cut for the making of lacings, lashes or the like, and the latter may be of any determined width and length and such selected width may be uniformly maintained during the cutting operation.

Another object of the invention is the provision of a machine of this character wherein a novel form of gauge is provided wherein a waist belt will be directed to a group of cutters for the stripping of the belt on the feeding thereof through the gauge, or a disk-like piece of leather may be acted upon by a single cutter so that the latter may be cut for the making of a lacing, lash or the like, the machine being of novel construction and its gauge being adjustable to vary the width of the cut material and such material being conveniently placed within the machine for the cutting operation thereof.

A further object of the invention is the provision of a machine of this character which is simple in construction, thoroughly reliable and efficient in its purposes, handy for use in belt stripping and lacing cutting, easy of adjustment, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 2 is a sectional view on the line 2—2 of Figure 1 looking in the direction of the arrows.

Figure 3 is an end elevation.

Figure 4 is a perspective view of the gauge.

Figure 5 is a perspective view of one of the knives of the machine.

Figure 6 is a perspective view of a modified form of gauge for lacing formation from a leather piece of material.

Figure 7 is a perspective view of a further modified form of gauge for belt stripping by the machine.

Similar reference characters indicate corresponding parts throughout the several views in the drawings.

Figure 1:
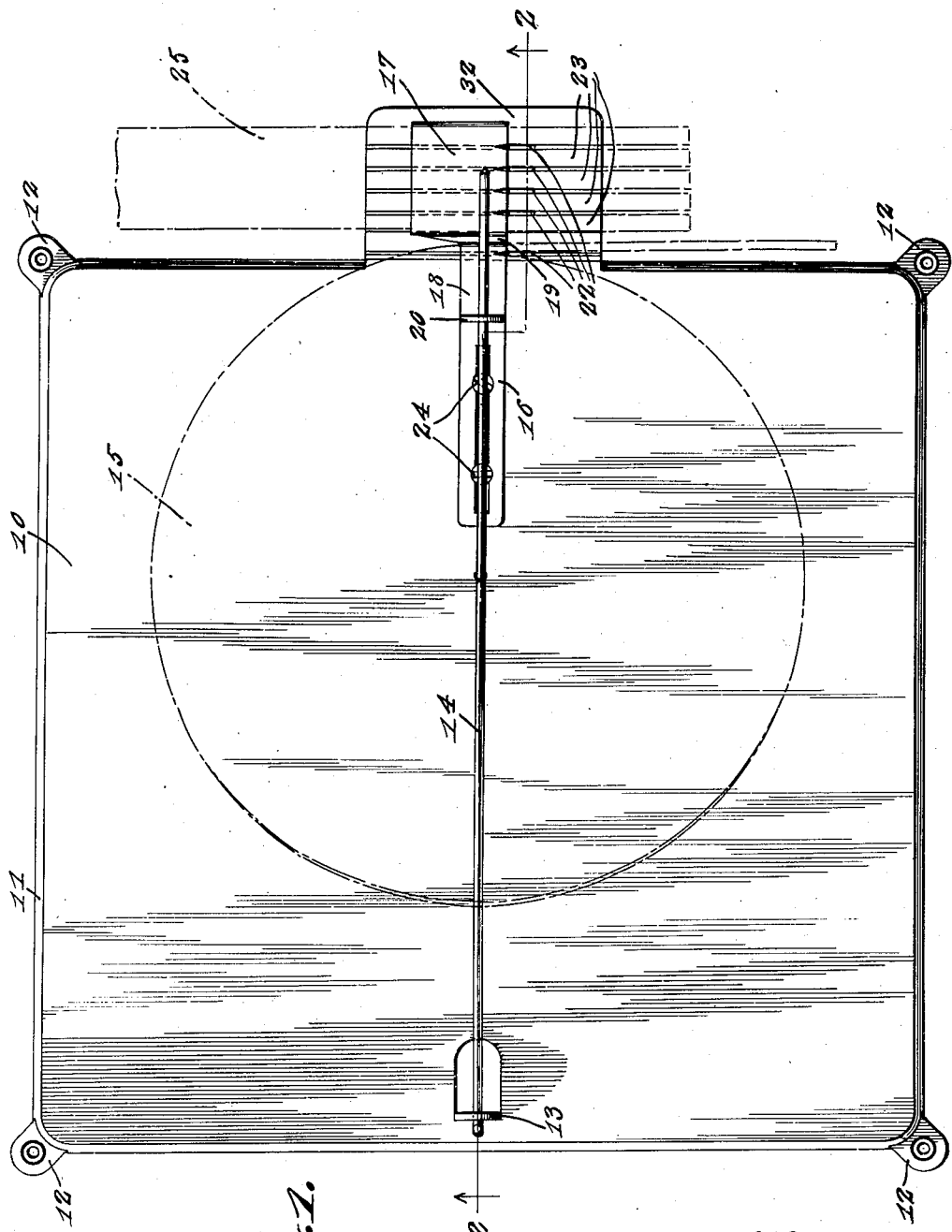
Figure 1 is a top plan view of the machine constructed in accordance with the invention, showing the dual use for belt stripping and for lacing cutting.

Referring to the drawings in detail, the machine comprises a work bed 10 preferably of substantially square formation having the depending marginal flange 11 with the outturned corner ears 12, these being of a kind for the reception of suitable fasteners to secure the bed firmly upon a support.

Cut and bent upwardly from the bed 10, contiguous to one end, is a post 13 having a suitable centrally located opening for the reception of a work guiding needle 14 which is adapted to penetrate the center of a piece of work 15 of disk contour, such as leather, the latter being of any convenient size, that is, diameter and thickness, and of the requisite quality.

Adapted to be aligned with the post 13 and located at the other end of the bed 10 is a work gauge comprising the flat bar-like base 16 having built thereon the guide portions 17 and 18, respectively, the latter being inwardly and alongside of the guide portion 17, both portions being separated by a depressed rib 19. The guide portion 18 has upstanding therefrom the vertical keeper 20 for the needle 14 and this keeper has provided therein a suitable center opening for the reception of said needle, the height of the keeper 20 being less than the height of the post 13, so that the said needle will be inclined in the direction of the gauge when at rest or engaged in the post and keeper and the piece of material 15 will creep toward the gauge when upon the needle.

Fixed to the bed 10 at the end carrying the gauge is a blade holder provided with a shelf 21 for the grouping thereupon of series of alternate knives and spacer members 22 and 23, respectively, the said knives being upstanding and arranged tangentially to the circular edge of the piece of material 15 when brought into cutting position in the gauge portion 18 and in this position the innermost knife 22 of the series will be active upon the piece of material 15 when the latter is rotated upon the needle 14 for the severing of a lacing or lash therefrom. It is, of course, understood that the gauge bar 16 is adjustably secured in place by the adjusting screws 24, whereby the gauge portion 18 can be properly set to regulate the width of cut by the said innermost knife 22 upon the piece of material 15 as the same is turned clockwise in confronting the said knife and the lacing or lash may be continuously cut from this piece of material and of the required width, the piece of material 15 being adapted to gradually creep upon the needle 14 in the direction of the blade as the diameter of such piece diminishes.

When it is desired to strip a belt, as at 25, the same is guided through the portion 17 of the gauge in confronting relation to the knives 22 next to said portion 17 of the gauge and the feeding of this belt causes the stripping thereof into pieces corresponding to the width of set of such knives.

In Figure 6 of the drawings there is shown a slight modification of gauge wherein the bar 26 has built thereon the open loop-like guide portion 27 having the upturned vertically extending keeper 28 alike to the keeper 20 and this portion 27 receives the periphery of the piece of material 15 to be cut into lacing or lashes or the like.

In Figure 7 of the drawings there is shown a further modification of gauge wherein the bar 29 has built thereon the closed loop-like guide 30, this being alike to the portion 17 and accommodating the belt 25 to be stripped.

The assembly of the knives 22 and spacer members 23 is had by a pair of bolts 31 and an outside angle piece 32, the same receiving the bolts 31 which are passed transversely through said knives and members 23 and are detachably threaded into the flange 11 of the bed 10. It should be obvious that the members 23 can be varied in width so as to increase or decrease the space between the knives 22 and thus varying the cutting disposition thereof. The bolts 31 firmly and securely clamp the knives and members together and maintain the knives in cutting disposition.

What is claimed is:

1. A machine of the character described comprising a work bed, a blade holder mounted upon said bed and having series of alternate knives and spacer members, an adjustable gauge carried by the bed and located to direct work to the knives, and a work-carrying needle disposed over the bed in spaced parallel relation thereto for rotatably fitting a piece of work in a longitudinal direction thereon into the gauge for action thereon by a knife of the series for a lacing cut upon the piece of work.

2. A machine of the character described comprising a work bed, a blade holder mounted upon said bed and having series of alternate knives and spacer members, an adjustable gauge carried by the bed and located to direct work to the knives,, a work-carrying needle disposed over the bed in spaced parallel relation thereto for rotatably fitting a piece of work in a longitudinal direction thereon into the gauge for action thereon by a knife of the series for a lacing cut upon the piece of work, and means for clamping the series of knives and spacers upon the holder and permitting the varying of the relation of the knives with respect to each other.

3. A machine of the character described comprising a work bed, a blade holder mounted upon said bed and having series of alternate knives and spacer members, an adjustable gauge carried by the bed and located to direct work to the knives,, a work-carrying needle disposed over the bed in spaced parallel relation thereto for rotatably fitting a piece of work in a longitudinal direction thereon into the gauge for action thereon by a knife of the series for a lacing cut upon the piece of work, means for clamping the series of knives and spacers upon the holder and permitting the varying of the relation of the knives with respect to each other, and means for adjustably securing the gauge upon the bed.

CHARLES G. MILLER.
WILLIAM R. FINTLEMAN.